United States Patent [19]
Hintz et al.

[11] 4,068,192
[45] Jan. 10, 1978

[54] GAS LASER STARTING

[75] Inventors: Robert T. Hintz; Fred T. Rogers, both of China Lake, Calif.

[73] Assignee: The United States of America as represented by the Secretary of the Navy, Washington, D.C.

[21] Appl. No.: 677,198

[22] Filed: Apr. 15, 1976

[51] Int. Cl.² .............................................. H01S 3/097
[52] U.S. Cl. ...................... 331/94.5 G; 331/94.5 PE; 315/323
[58] Field of Search .................. 331/94.5 PE, 94.5 K, 331/94.5 G; 315/323, 262, 263, 335, 336, 337

[56] References Cited
U.S. PATENT DOCUMENTS 3,781,710 12/1973 Boudinet et al. ................ 331/94.5 K
3,863,107 1/1975 Mogensen et al. ................... 315/323

Primary Examiner—William L. Sikes
Assistant Examiner—Marcus S. Rasco
Attorney, Agent, or Firm—R. S. Sciascia; Roy Miller

[57] ABSTRACT

A starting device for a sealed, cross-flow gas laser for operating at least two electric discharges simultaneously in a single laser cavity using primary fins between the cathodes and anodes of the cavity as intermediate electrodes. A series of high voltage relays and resistors are placed in parallel with the discharge path between adjacent fin electrodes and by switching out pairs of relays current is coupled to the discharge path, one fin at a time.

5 Claims, 3 Drawing Figures

GAS LASER STARTING

BACKGROUND OF THE INVENTION

The invention is concerned with a magnetically stabilized, sealed, cross flow $CO_2$ laser to be used in an airborne environment. In the system, the operating voltage is dependent on the lengths of the discharges in the laser. To turn the entire discharge region on would require plasma breakdown voltages in excess of 10 kv and operating voltages on the order of 6–7 kv. Both of these voltages are troublesome in airborne applications and require greater internal insulation for the laser. By splitting the discharge, the breakdown voltages can be kept below 5 kv with corresponding operating voltages of 3–3.5 kilovolts. The difficulty encountered in extending this technique to multiple discharges in that each plasma has an associated cathode dark space. These are low or zero gain regions for lasing. Hence, the more discharges there are, the greater length of active media is occupied by dark spaces.

Another problem associated with the starting of the two discharges is that whichever discharge fires first will then provide a low impedance path to ground for the other unsaturated discharge. This is further complicated since the entire outside of a laser must be maintained at ground potential (except the high-voltage input leads) in the system.

SUMMARY OF THE INVENTION

The invention comprises a non-dissipative starting device for a cross-flow $CO_2$ gas laser for operating at least two electric discharges simultaneously in the laser cavity. The plasma guides between the cathodes and anodes are used as intermediate electrodes. A series of high voltage relays and resistors are placed in parallel with the discharge path between adjacent plasma guides and by switching out pairs of relays, current is coupled to the discharge path, one plasma guide at a time.

DESCRIPTION OF THE PREFERRED EMBODIMENT

Figure 1:
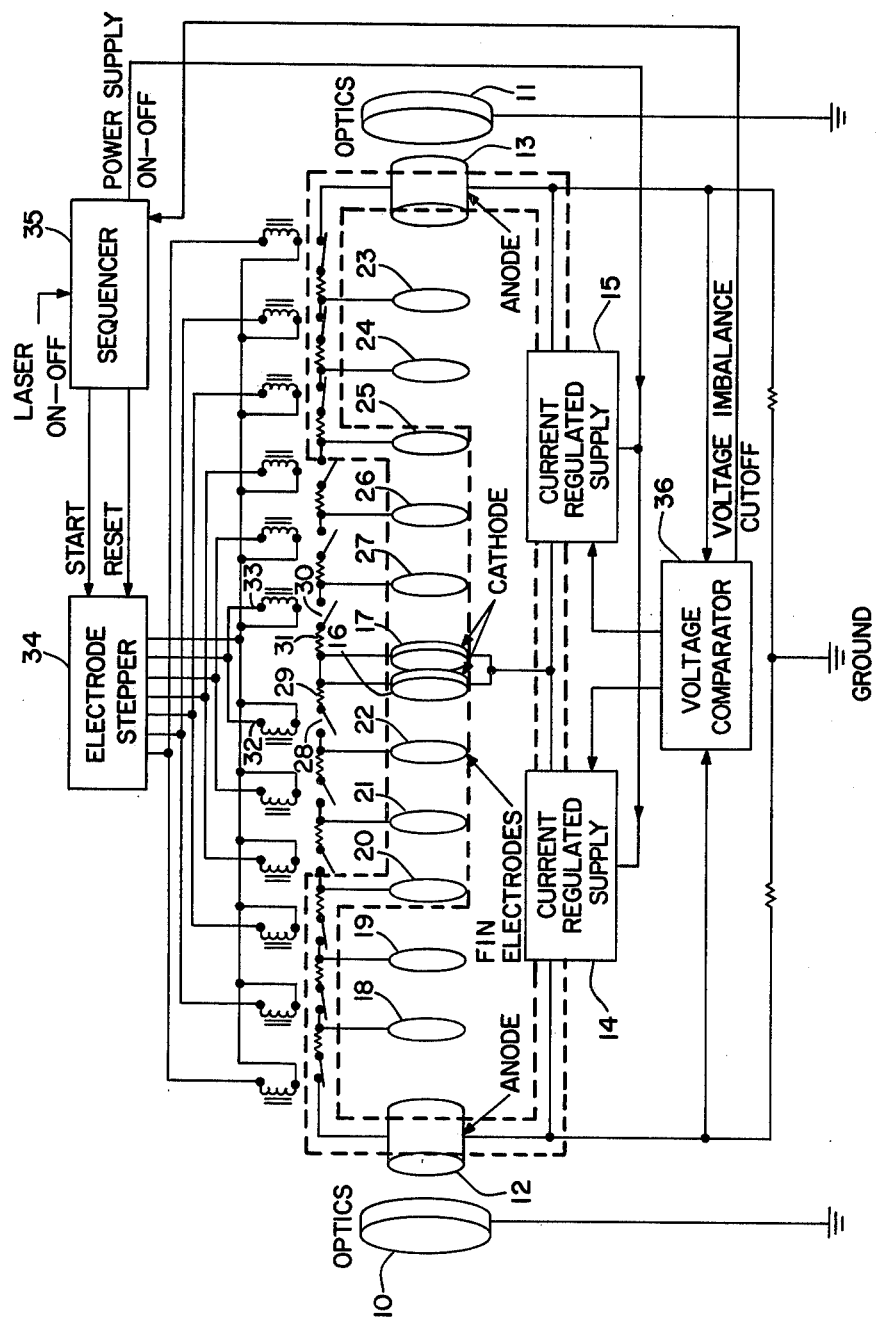
FIG. 1 is a schematic diagram of a preferred embodiment of the invention.

FIG. 1 illustrates the preferred embodiment of the invention wherein optics 10 and 11 define the exterior limits of the laser cavity. Positioned within the cavity are anodes 12 and 13 which are connected to current regulated power supplies 14 and 15 respectively. The power supplies 14 and 15 are in turn connected in common to a pair of cathodes 16 and 17.

Positioned between anode 12 and cathode 16 are a series of plasma guides 18, 19, 20, 21 and 22 which will be hereinafter referred to as fin electrodes. Also positioned between anode 13 and cathode 17 are another series of plasma guides 23, 24, 25, 26 and 27 which will also be hereinafter referred to as fin electrodes.

Each of the plasma guides or fin electrodes 18–22 is connected to one another by a relay contact resistor combination such as relay contact 28 and resistor 29. Only one combination is numbered and referred to in that they are all exactly the same. This holds true for the fin electrodes 23 through 27 wherein the same relay contact resistor combination as at 30, 31 respectively is numbered and referred to.

Acting in conjunction with each relay contact resistor combination is an actuating solenoid such as set forth at 32 and 33 for the purposes of illustration. The actuating solenoids are all the same and only two are numbered for the purposes of illustration. One side of each of the actuating solenoids is connected in common back to an electrode stepper 34. The other side of a pair of actuating solenoids such as 32 and 33 may be connected in common and also back to the electrode stepper 34. Corresponding pairs of actuating solenoids are connected the same and back to the electrode stepper 34 for purposes to be explained subsequently.

A sequencer 35 is provided having a laser on-off input, a power supply on-off output, a voltage imbalance input, and an electrode stepper start and reset output.

A voltage comparator 36 is provided which is connected to each of the anodes 12 and 13 for measuring the potential therebetween. The voltage comparator also provides a pair of outputs to the respective current regulated supplies 14 and 15 and a voltage imbalance cutoff output to the sequencer 35.

Figure 2:
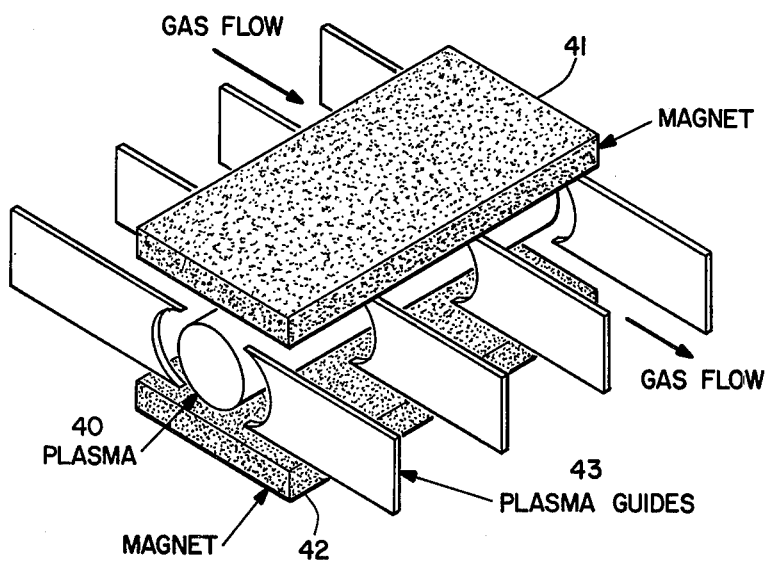
FIG. 2 is a schematic illustration of the plasma guides interacting with the plasma.

FIG. 2 is a schematic illustration showing how the plasma guides interact with the plasma and also showing the position of the magnets which control the plasma. Plasma 40 is shown as contained between upper and lower magnets 41 and 42. The gas flow is contained and guided by the plasma guides one of which is numbered as 43.

Figure 3:
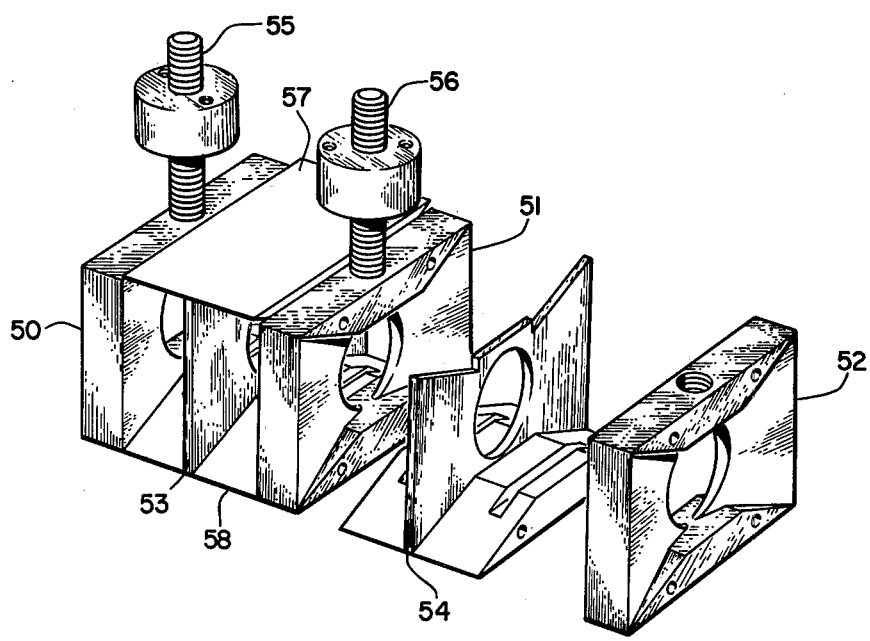
FIG. 3 is an illustration of the plasma guide assembly.

FIG. 3 illustrates the actual plasma guide assembly wherein primary plasma guides 50, 51 and 52 are shown with intermediate plasma guides 53 and 54 therebetween. The plasma guides are formed of titanium however, other suitable materials may be used. The primary fins are used as electrodes in the starting procedure and are connected to the outside of the cavity through holes in the cavity by brass bolts such as 55 and 56. In between each primary fin, are beryllium oxide spacers such as at 57 and 58 on the top and bottom respectively of the cavity. Their function is to maintain the flow velocity through the discharge region and to support either one or three secondary fins such as at 53 and 54. The secondary fins are used only as plasma guides.

In operation, since the current and not the voltage must be regulated, there often exists a voltage imbalance between the two discharges when established. The cathodes being tied together are at the same potential, but the anodes may be at different potentials and therefor cannot both be grounded. Instead, the anodes are isolated from the optics and floated on each side of ground by a voltage divider as shown in FIG. 1.

An electrode holder, not shown, is used at each end of the cavity also to insulate the anodes 12 and 13, which may be at a potential of several hundred volts from ground. The insulating distance between the anodes and ground is chosen to stand off several hundred volts. This is sufficient to allow the power supplies to current regulate under all normal operating conditions.

However, the insulating distance is not sufficient for each discharge to start independently. Whereas the operating voltage is around 3 kilovolts, the voltage required to break down the gas and start the discharge across the entire region would be close to 5 kilovolts. This means that if the two discharges did not start at precisely the same time, a potential difference of several thousand volts could exist between the two anodes, and the insulation standoff from the grounded optical mounts would be greatly exceeded.

In order to circumvent the problem, the discharges are started in steps, using the primary fins as intermediate electrodes. The high voltage relays and resistors are in parallel with the discharges as shown in FIG. 1. By switching out pairs of relays, the current is transferred from the resistors to the discharge, one fin at a time. Since the difference between the starting and the running voltages for the space between primary fins is only several hundred volts, the imbalances that could exist between the anodes are less than the breakdown voltage for the insulating distance to ground. In FIG. 1, three resistor relay switches are shown as open on either side of the system such that the plasma is formed between electrode 20 and cathode 16 on one side of the cavity and electrode 25 and cathode 17 on the other side of the cavity.

A voltage comparator 36 is used to measure the voltage imbalance of the anodes and override the current regulating curcuitry. This is done so that voltage transients will not shut down the power supplies 14 and 15.

The system provides reliable turn-on of two discharge banks with no power dissipation after discharge turn-on is completed since all relays are no longer receiving power and all resistors are switched out. Also, the relays chosen are durable enough for airborne applications and also minimize contact sparking. In addition, the turn-on technique is unaffected by power supply noise prevalent in airborne systems.

What is claimed is:

1. In a cross flow gas laser;
a laser cavity;
electrode means at either end of the laser cavity at a first potential;
plasma guides at spaced intervals between said electrodes;
other electrode means at a second potential positioned intermediate said electrode means at either end of said laser cavity;
switching means serially and electrically interconnecting each of said plasma guides and said electrode means to said other electrode means;
supply voltage means connected to provide said first and second potentials to said electrode means and said other electrode means thereby creating a potential difference between said electrode means and said other electrode means;
and stepping means for operating said switching means sequentially to cause said plasma guides to become effective as electrode means with respect to said other electrode means.

2. In a cross flow gas laser as set forth in claim 1 wherein;
said electrode means comprise anodes at either end of the laser cavity;
and said other electrode means comprise a cathode means at said intermediate portion of the laser cavity.

3. In a cross flow gas laser as set forth in claim 1 wherein;
said electrode means comprise a single anode at either end of the laser cavity;
said other electrode means comprise a pair of cathodes at said intermediate portion of the laser cavity;
and said supply voltage means comprises a pair of current regulated power supplies;
one of each of said pair being connected between a cathode and anode in the laser cavity.

4. In a cross flow gas laser as set forth in claim 3 and further including;
voltage comparator means connected between said anodes to compare the voltages at the anodes and if they differ by a predetermined amount turn off the laser.

5. In a cross flow gas laser as set forth in claim 1 wherein;
said stepping means for operating said switching means sequentially causes said plasma guides to become effective as anodes beginning with the plasma guides closest to said other electrode means.

* * * * *